(12) United States Patent
Yamamoto et al.

(10) Patent No.: US 7,301,713 B2
(45) Date of Patent: Nov. 27, 2007

(54) OBJECT LENS UNIT AND OPTICAL PICKUP DEVICE EMPLOYING THE UNIT

(75) Inventors: Shogo Yamamoto, Hachioji (JP);
Yuichi Atarashi, Hachioji (JP);
Kazuhiro Wada, Hachioji (JP);
Tsutomu Shimizu, Misato (JP)

(73) Assignee: Konica Minolta Opto, Inc., Tokyo (JP)

( * ) Notice: Subject to any disclaimer, the term of this patent is extended or adjusted under 35 U.S.C. 154(b) by 28 days.

(21) Appl. No.: 11/221,657

(22) Filed: Sep. 8, 2005

(65) Prior Publication Data
US 2006/0056074 A1 Mar. 16, 2006

(30) Foreign Application Priority Data
Sep. 16, 2004 (JP) ............... 2004-270233

(51) Int. Cl.
*G02B 7/02* (2006.01)

(52) U.S. Cl. ............... 359/820; 359/811; 359/823

(58) Field of Classification Search ............ 359/796, 359/717, 820, 811, 823; 369/44.23, 112.05, 369/112.17, 275.2, 13.28, 13.53, 44.14; 250/214 R, 250/201.5
See application file for complete search history.

(56) References Cited

U.S. PATENT DOCUMENTS

| | | | | |
|---|---|---|---|---|
| 4,964,701 A * | 10/1990 | Dorschner et al. | ......... | 349/202 |
| 5,177,641 A * | 1/1993 | Kobayashi et al. | ......... | 359/820 |
| 6,225,614 B1 * | 5/2001 | Ono | ......... | 250/201.5 |
| 6,449,095 B1 * | 9/2002 | Ohtaki et al. | ......... | 359/566 |
| 6,487,026 B2 * | 11/2002 | Baartman et al. | ......... | 359/808 |
| 6,594,204 B1 * | 7/2003 | Yamamoto et al. | ...... | 369/44.14 |
| 2001/0038499 A1 * | 11/2001 | Baartman et al. | ......... | 359/821 |
| 2002/0097508 A1 * | 7/2002 | Wada et al. | ......... | 359/804 |
| 2004/0021951 A1 * | 2/2004 | Maeda et al. | ......... | 359/643 |
| 2004/0032671 A1 * | 2/2004 | Wada et al. | ......... | 359/819 |

FOREIGN PATENT DOCUMENTS

| | | |
|---|---|---|
| JP | 2001-006203 | 1/2001 |
| JP | 2001-093179 | 4/2001 |
| JP | 2004-062971 | 2/2004 |

* cited by examiner

*Primary Examiner*—Scott J. Sugarman
*Assistant Examiner*—James R Greece
(74) *Attorney, Agent, or Firm*—Cohen Pontani Lieberman & Pavane LLP

(57) ABSTRACT

An object lens unit for an optical pickup comprising: a first optical element positioned facing an optical information recording medium; a second optical element positioned on a light source side of the first optical element; and a frame which has a first reference surface in contact with the first optical element to position the first optical element in an optical axis direction and a second reference surface in contact with the second optical element to position the second optical element in the optical axis direction so that the first optical element and the second optical element are fixed to be integrated with the frame, wherein the first optical element, the second optical element and the frame are attached, as a single optical component, to another member.

18 Claims, 7 Drawing Sheets

OBJECT LENS UNIT AND OPTICAL PICKUP DEVICE EMPLOYING THE UNIT

This application is based on Japanese Patent Application No. 2004-270233 filed on Sep. 16, 2004 in Japanese Patent Office, the entire content of which is hereby incorporated by reference.

BACKGROUND OF THE INVENTION

The present invention relates to optical pickup devices for recording and reproducing optical information recording media, and to an object lens unit used in such optical pickup devices.

In recent years, with the practical application of short wavelength red semiconductor lasers, the Digital Versatile Disk (DVD) which is a high density optical disk having a large memory capacity and being of about the same size as a CD (Compact Disk), which is a conventional optical disk (also called an optical information recording medium) has been developed and commercialized.

Following this, optical pickup devices have been developed that are compatible with several types of optical information recording media (specifically, CDs and DVDs). As a pickup of this type, known is one (for example, see Patent Document 1) that features a reduced size and is simpler by using lasers with different wavelengths depending on the type of optical information recording medium, forming diffracted light using diffraction optical elements, and focusing the diffracted light of different orders as information recording light or information reproducing light depending on the wavelength by using a condenser lens. In addition, a phase control element (diffraction optical element) and an object lens (condenser lens) are fixed by a holder within the pickup device, and in particular, a type has been disclosed (see Patent Document 2) in which both the phase control element and the object lens have respective positioning marks to adjust the central axes.

On the other hand, in the near future, still next-generation optical disks of higher density are expected to be commercialized. In the condensing optical systems of optical pickup devices using such next-generation optical disks as a medium, in order to achieve high density of recording signals, or in order to reproduce high-density recorded signals, it is required to reduce the diameter of the focused spot on the information recording surface using an object lens. This requires shorter laser wavelengths, which is a light source, and a higher numerical aperture number of the object lens. A blue-violet semiconductor laser of a wavelength of approximately 400 nm is the laser that is expected to soon be practically applied as a short wavelength laser light source.

As an example of the research and development of high-density optical disk system that can carry out recording and reproduction of information using such a short wavelength laser light source, well-known ones are an optical disk that can carry out information recording and reproduction with a specification of an NA (Numerical Aperture) of 0.85 and a light source wavelength of 405 nm (such as the Blu-ray Disk), and an optical disk that can carry out recording and reproduction of information at a specification of an NA of 0.65 and a light source wavelength of 405 nm (for example, the HDDVD). (Hereinafter, all optical disks with a specification of a light source wavelength of 405 nm are collectively referred to as "High-Density DVD".)

Following the development of such high-density DVDs, a lens unit has been proposed for an optical pickup unit that integrates a diffracting optical element and a focusing lens and that carries out recording and reproduction of information from three types of optical information recording media conforming to different standards such as high-density DVD, normal DVD, and CD (see Patent Document 3).

Patent Document 1: Tokkai No. 2001-93179
Patent Document 2: Tokkai No. 2001-6203
Patent Document 3: Tokkai No. 2004-62971

However, in the technologies disclosed in Patent Documents 1 and 2, there still remain the problems of alignment of various optical elements that are the constituent elements of the optical system in the manufacturing of condensing optical system for optical pickups. For example, in Patent Document 1, although it has been described that the condensing lens and the diffraction optical element are placed coaxially with the optical axis by a holder, a specific clear description has not been given regarding the positioning in the direction of the optical axis nor about any concrete method for the coaxial placement. In addition, in Patent Document 2, although there is description of alignment using positioning marks on the phase control element (diffraction optical element) and on the object lens (the condensing lens), there is no description of the positioning related to the direction of the optical axis. Further, in both Patent Documents 1 and 2, each of the optical elements is mounted directly as a separate component onto the holder which is a part of the optical pick-up device. In other words, the accuracy of relative positioning between the different optical elements and the accuracy of alignment of each optical element based on the holder is extremely important in order to increase the image forming performance in the condensing optical system. However, in the above technologies, the work becomes complicated because the work of relative positioning between the different optical elements and the work of their alignment relative to the holder are incorporated in the assembly process of the optical pickup device, whereby it is difficult to obtain high accuracy of condensing or image formation by a condensing optical system comprising two optical elements.

SUMMARY OF THE INVENTION

Therefore, the purpose of the present invention is to provide an object lens unit for optical pickup devices that can be manufactured relatively easily and that enable to carry out the relative positioning between the different optical elements and the alignment relative to the holder accurately and efficiently during the manufacturing process. In addition, it is a purpose of the present invention to provide an optical pickup device using the same.

To solve the above problems, the object lens unit for optical pickups according to the present invention is provided with a first optical element placed facing the optical information recording medium, a second optical element placed on the light source side of the first optical element, and a frame that has a first and a second reference surface that are in contact respectively with the first and the second optical elements to position the two optical elements in the optical axis direction, wherein the frame fixes the first and the second optical elements in an integrated manner, and the first and second optical elements along with the frame are fixed to other members as a single optical component.

In the object lens unit of the invention, because accurately machined reference surfaces are provided on the frame and because each optical element is directly in contact with each of the reference surfaces to be fixed, accurate relative positioning between the elements is possible. At the same time, because each optical elements is secured to the frame in an integrated manner, it has a specific accuracy and can be handled as an independent optical component. Furthermore, by having a construction of three components, being the two optical elements and a frame, the shape and structure of each part is simplified and their manufacturing becomes easier. Further, though there are cases in which each reference surface is at an angle to the optical axis, a desired precise tilt angle can be ensured by this reference surface.

In order to solve the above problem, the optical pickup device according to the present invention is provided with the above object lens unit, a holder that supports the object lens unit and is shifted along with the object lens unit, and a fixing means that fixes the object lens unit to the holder, and has a feature that a light spot is formed on the recording surface of the optical information recording medium by said object lens unit.

The object lens unit can be handled as an independently integrally shaped optical component even though it has high condensing characteristics due to two optical elements. Therefore, since the relative positions of the different optical elements inside the object lens unit have been adjusted at a high degree of accuracy, in the above fixing means, there is no need to give consideration for the accuracy of the optical characteristics of each optical element inside the object lens unit, and it is sufficient if it can merely improve the accuracy of mounting the object lens unit to the holder. In the optical pickup device of the present invention, since an object lens unit of the above type is incorporated, it is possible to obtain an inexpensive unit at a high accuracy.

DETAILED DESCRIPTION OF THE PREFERRED EMBODIMENT

Figure 1:
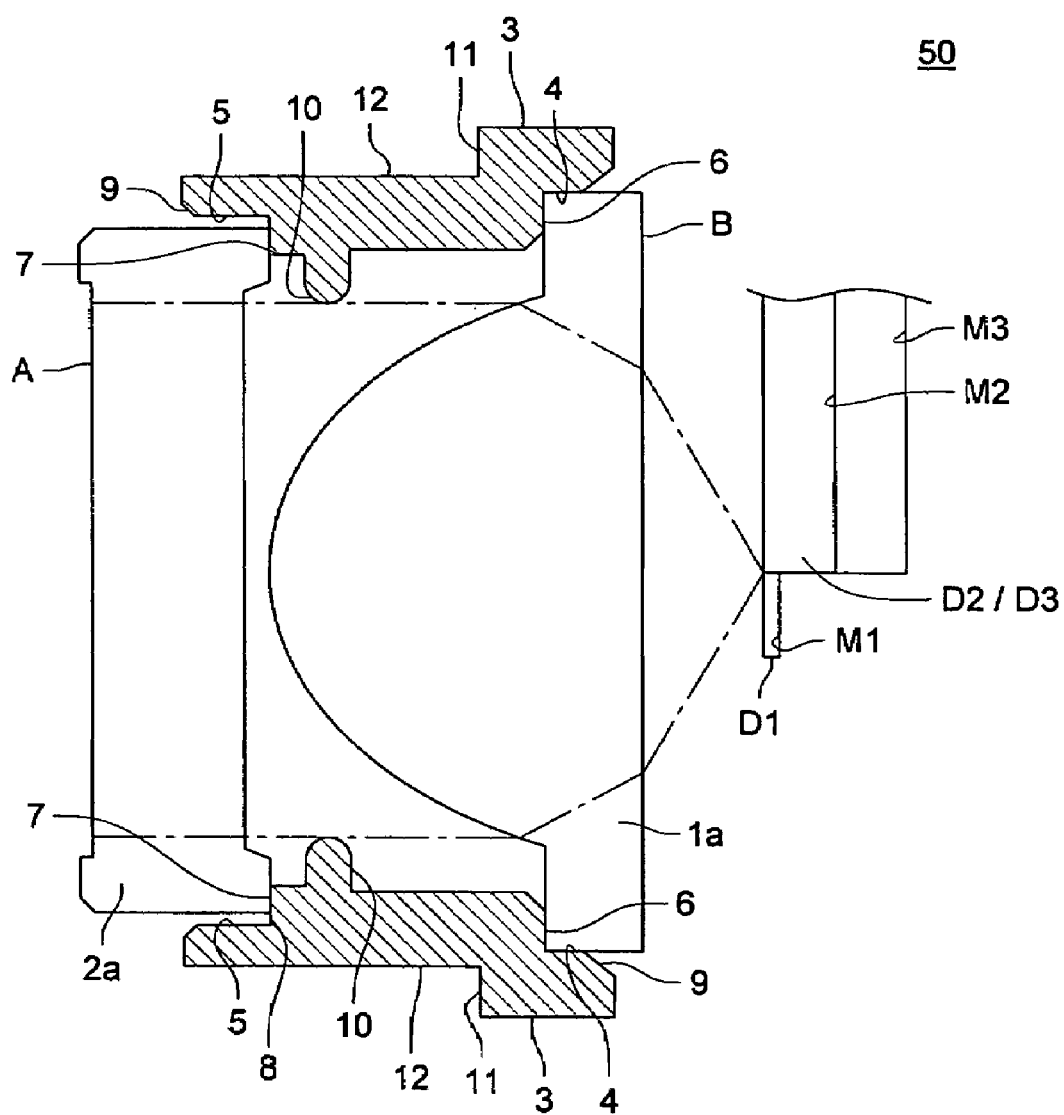
FIG. 1 is a cross-sectional side view of the object lens unit of the first preferred embodiment.

Preferred embodiments of the invention to overcome the above problems will now be explained.

Further, as another embodiment of the present invention, in an object lens unit, the frame is provided with the first and the second fitting portions in which first and the second optical elements are respectively fitted and that is used to determine the relative positions between the optical elements in a direction perpendicular to the optical axis. In this case, because the relative position is determined between the optical elements concerning the direction perpendicular to the optical axis by the first and the second fitting portions, it is possible to adjust the optical performance characteristics to a still higher degree of accuracy of the optical unit combining the two optical elements.

In order to solve the above problem, another object lens unit of the optical pickup according to the present invention comprises a first optical element placed facing the optical information recording medium, a second optical element placed on the light source side of the first optical element, a frame that has not only a first and a second reference surface both of which are in respective contact with the first and the second optical elements, and that position these elements in the optical axis direction to fix the first and the second optical elements as an integrated manner, but also has a third reference surface that is used to position the first and second reference surfaces relative to other members. The frame, further, has a first fitting portion and a second fitting portion in which the first and the second optical elements are respectively fitted wherein the fitting portions are used to determine the relative position between the optical elements in the direction perpendicular to the optical axis, and a third fitting portion that is used to determine the relative position of the first and second fitting portions relative to the other members in a direction perpendicular to the optical axis.

In the object lens, condensing control is achieved mainly by two optical elements, and in addition, since the relative positioning of each of the optical elements related to the optical axis is done certainly using the first and the second reference surfaces provided in the frame of the object lens unit, and also, since determining the relative positions between the optical elements related to the direction perpendicular to the optical axis is done by the first and the second fitting portions, it is possible to adjust the optical performance characteristics of the optical unit combining the two optical elements at high accuracy. In addition, apart from the reference surfaces for those optical elements, since the frame has a third reference surface and a third fitting portion, it is possible to carry out certainly the mounting of the frame to the holder which is a separate member from the first fitting portion, from the second fitting portion, and from the object lens unit. It is also possible to carry out alignment of each of the optical elements in the direction perpendicular to the optical axis and positioning in the direction of the optical axis. Furthermore, by having a construction with the three components of the two optical elements and a frame, the shape and structure of each part is simplified, and overall manufacturing of the device becomes easier. Normally, in the conventional case of directly mounting the two optical elements to the lens holder, for example, since the optical axis adjustment and adhesion is done while inverting the lens holder in the up and down direction, and since the shape of the lens holder is complicated as well as large, the manufacturing equipment for its assembly also becomes large. In contrast with this, in the case of mounting the two optical elements to the frame, the manufacturing equipment can be made smaller to carry out assembly. Because of this, the assembly and adjustment become easier.

Further, in another embodiment of the present invention, the frame is provided with a specific clearance perpendicular to the optical axis in at least one of the first and second fitting portions. In this case, in at least one of the first and the second fitting portions, movement becomes possible in a direction perpendicular to the optical axis during alignment due to that clearance, and fine adjustment becomes possible to adjust the center positions of the two optical elements.

Further, in another embodiment of the present invention, in the object lens unit, the first optical element, the second optical element, and the frame are each molded plastic components. In this case, not only the manufacturing of each optical element is simplified and the degree of freedom for molding increases, but also the manufacturing of the object lens becomes easier and the cost of overall manufacturing of the unit becomes cheaper. Also, here, the term "molded plastic component" is not limited to components made of pure plastic but also includes components made of plastic to which glass has been added. For example, the case when the frame is a molded component made of plastic, and the case when it is a molded component made of plastic to which 5 to 45% glass has been added, are both included in the expression "molded plastic component". One of the desired effects of adding glass to plastic is an increase in strength of the frame.

Further, in another embodiment of the present invention, a second optical element is formed to have an orbicular zone structure in which it is divided into a plurality of orbicular zones on at least one of the optical surfaces and the neighboring orbicular zones cause a specific optical path difference to the incident light. In this case, using the aberration correction function of the orbicular structure, it becomes possible to allow the object lens unit to be compatible with several types of optical information recording media, to correct color aberration, and to correct temperature characteristic aberration.

Further, in another embodiment of the present invention, the above orbicular zone structure is a diffraction structure and the second optical element is a diffraction lens. In this case, a plurality of lasers used in the optical pickup device are subjected to the diffraction phenomenon and form diffracted light according to the wavelength. It is possible to condense diffracted light of different orders corresponding to each wavelength as the information reading light or the information recording light using the differences of the interference conditions.

Further, in another embodiment of the present invention, the frame is provided with an aperture. In this case, unwanted light can be blocked or the amount of light can be adjusted.

Still further, in another specific embodiment according to the present invention, the above aperture is positioned between said first optical element and said second optical element. In this case, there is no need to provide another aperture in the optical pickup device installed with this object lens unit, and hence it can be downsized.

Yet further, in another specific embodiment according to the present invention, the above aperture is positioned on the light source side. In this case, unwanted light that becomes cause of visual noise can be blocked before it enters the object lens unit, and it is also possible to adjust the amount of laser light.

Further, in another embodiment of the present invention, the frame is provided with a reflection prevention means at least on the inside facing the optical surface of the optical element. In this case, it is possible to prevent generation of visual ghost and to increase the tracking accuracy.

Further, in another embodiment of the present invention, the frame is provided with an adhesive collecting section formed in conjunction with an optical element and having a cross-sectional V-shape or other appropriate shape in at least one of the first and second fitting portions. In this case, it is possible to ensure strong adhesion and to prevent the adhesive from protruding beyond the periphery during or after adhering.

Further, in another embodiment of the present invention, the frame has a tube-shaped form, and also on the two ends of which said first reference surface and first fitting portion as well as said second reference surface and second fitting portion are respectively provided, and also a discontinuous adhesion section is formed along the outer periphery of at least one of the first and the second fitting portions. In this case, air is not kept sealed in the space surrounded by the first optical element, the second optical element, and the frame, which prevents condensation.

Further, in another embodiment of the present invention, the frame has a tube-shaped form, and on the two ends of which said first reference surface and first fitting portion as well as said second reference surface and second fitting portion are respectively provided, and further a ventilation hole connecting the interior of the frame with the exterior is provided at a specific location on the side surface between the first and the second reference surfaces. In this case, air is not kept sealed in the space surrounded by the first optical element, the second optical element and the frame, which prevents condensation.

Further, in another embodiment of the present invention, the frame has a tube-shaped form, and on the two ends of which said first reference surface and first fitting portion as well as said second reference surface and second fitting portion are respectively provided, and a cut-out part connecting the interior of the frame with its exterior is provided on at least one of a combination of the first fitting portion and the first reference surface in contact with it and a combination of the second fitting portion and the second reference surface in contact with it. In this case also, air is not kept sealed in the space surrounded by the first optical element, the second optical element and the frame, which prevents condensation.

Other preferred embodiments of the invention to solve the above problems will now be explained.

The First Preferred Embodiment

FIG. 1 is a cross-sectional side view of the object lens unit 50 of the first preferred embodiment, and this object lens unit 50 is configured so that it is compatible with three types of optical disks (high density DVD, DVD, and CD) of different standards (such as recording density) and has been configured so that it can carry out recording/reproduction of information in these optical disks. Further, this object lens unit 50 is positioned facing the optical disks D1, D2, and D3 which are optical information recording media corresponding to high density DVD, DVD, and CD, and has the first optical element B which is the first optical element that forms the focus spot on the optical disk D1 by condensing the light from the light source, the second optical element A which is the second optical element that forms diffracted light, and the tube-shaped frame 3 which fixes the first optical element B and the second optical element A in an integrated manner. Here, the first optical element B, the second optical element A, and the frame 3 are formed either of plastic or of plastic to which 5 to 45% of glass fiber has been added.

The first optical element B is a biconvex lens with the side towards the optical disks D1, D2, and D3 being relatively flat and the side towards the second optical element A is an aspheric surface protruding outward substantially, and condenses the diffracted light of the diffraction order corresponding to the different wavelengths from the second optical element A onto specific locations of each of the optical disks D1, D2, and D3.

The second optical element A has an orbicular zone structure in which the element is separated into a plurality of orbicular zones, and by having a diffraction structure formed so that a specific optical path difference is generated by the neighboring orbicular zones for the incident light beam, a diffracted light is formed corresponding to the laser light having different wavelengths corresponding to different optical disks. At this time, by using the aberration correction function of the orbicular zone structure, it becomes possible to allow the object lens unit 50 to be compatible with several types of optical disks D1, D2, and D3, to correct color aberration, and to correct the temperature characteristics aberration. In the case of the present preferred embodiment, by condensing diffracted light of different orders of diffraction for each wavelength of laser light by the combination of the first optical element B and second optical element A, it becomes possible to carry out imaging with higher accuracy than specific one for all the laser lights, and it becomes possible to use that laser light as the information reading light or the information recording light for each of the optical disks D1, D2, and D3.

Here, the degree of condensing by the second optical element A is weak compared to the degree of condensing by the first optical element B. More concretely, when the paraxial power of the first optical element B is taken as P1 [$m^{-1}$] and the paraxial power of the second optical element A is taken as P2 [$m^{-1}$], their values are such that the relationship $-0.2 \leq P2/P1 \leq 0.2$ is satisfied. In this case, since the paraxial power of the second optical element A becomes small, the curvature of the optical surface of the second optical element A becomes small. As a result, since the effect of the shadows due to the step parts of the orbicular zone structure can be lessened, the reduction in the efficiency of use of the laser can be prevented. Further, by reducing the curvature of the optical surface on which the orbicular zone structure of the second optical element A is formed and by making the curvature of the first optical element B large, it is possible to maintain a large pitch of the orbicular zone structure and to suppress, to a low value, the reduction in the efficiency of use of the laser due to the manufacturing tolerances of the shape of the orbicular zone structure. In addition, by making the paraxial power of the second optical element A small, a large distance (working distance) can be obtained between the object lens 50 and each the optical disks D1, D2, and D3.

The frame 3 has a cylindrical overall external shape, the two ends of which are provided with the cylindrical first fitting portion 4 and second fitting portion 5, ring-shaped first reference surface 6 and second reference surface 7, ring-shaped aperture 10, ring-shaped third reference surface 11, and the third fitting portion 12. The first fitting portion 4 and the second fitting portion 5 determine the relative positions in the direction of the optical axis of the first optical element B and second optical element A. At the time of mounting these, the first reference surface 6 and second reference surface 7 respectively connect the first and second fitting portions, and become the reference for aligning the first optical element B and second optical element A in the direction of the optical axis and relating to the inclination against the axis. The second fitting portion 5 is provided with a clearance 8. This clearance 8 is intended for carrying out fine adjustment of the center position of the second optical element A against the first optical element B at the time of carrying out alignment of the second optical element A. A chamfer-shaped adhesive collecting section 9 is provided at the end parts of the first and second fitting portions 4 and 5. A V-shaped groove is formed by the combination of this adhesive collecting section 9 and the outer peripheries of the flange parts 1a and 2a of the first optical element B and the second optical element A, and this groove prevents the adhesive from protruding to the surroundings during or after adhering these two optical elements A and B. Here, flange parts 1a and 2a are retaining portions provided on the periphery of optical effective surfaces of the first optical element B and the second optical element A respectively. They are fixed by adhering while they are directly in contact with the ring-shaped first reference surface 6 and second reference surface 7, and further, they are directly in contact with the cylindrical first fitting portion 4 and second fitting portion 5, or facing these fittings with clearances. Thereby, the flanges fill the role of maintaining constant relative positions of optical effective surfaces of the optical elements against the frame. The aperture 10 placed between the first and second fitting portions 4 and 5 and on the inner wall of the frame 3 carries out the cutting off of unwanted light or the adjustment of the amount of light at the time of using the object lens 50. The third reference surface 11 becomes the reference related to the direction of the optical axis or the inclination, at the time of mounting the object lens unit to the holder which is a component of the optical pickup device, and the third fitting portion 12 becomes the reference related to a direction perpendicular to the optical axis (details will be given later).

The manufacturing process of the object lens 50 according to the present preferred embodiment is described in the following. To begin with, the first optical element B is fixed to the frame 3. The flange surface of the first optical element B is made to come into contact with the first reference surface 6, and adhesive is inserted into the adhesive collecting section 9. At this time, the positioning in a direction perpendicular to the optical axis is carried out because the first fitting portion 4 and the peripheral part of the flange part 1a of the first optical element B come into contact with each other. Because of this, first optical element B gets fixed at the specific position. At this time, since excessive adhesive gets collected in the adhesive collecting section 9, the adhesive from protruding over the periphery can be prevented either during or after adhering.

Next, the second optical element A is fixed on the side opposite to that of the first optical element B mounted on the frame 3. The positioning with the first optical element B is done by making the flange surface of the second optical element A come into contact with the second reference surface 7. At this time, the internal diameter of the second fitting portion 5 has been designed to be slightly larger than the outer diameter of the second optical element A, and this difference becomes the clearance 8 (for example, approx. 50 µm). Because of this, the second optical element A becomes movable in a direction perpendicular to the optical axis, and it is possible to carry out the relative positioning related to the direction perpendicular to the optical axis while watching the opposing first optical element B. Further, at this time, in order to carry out the positioning definitely, it is also possible that markers that become the reference for positioning are formed at the center positions, etc., of the optical surfaces of each of the first optical element B and the second optical element A. The markers are desirably formed on the optical surfaces of the first optical element B and of the second optical element A that come close to each other, so that they can be seen easily when watching them under a microscope.

After carrying out the positioning, adhesive is inserted into the adhesive collecting section 9. Because of this, the second optical element A gets fixed in the aligned condition. At this time, since excessive adhesive gets collected in the adhesive collecting section 9, the adhesive from protruding over the periphery can be prevented either during or after adhering. Further, the aperture 10 also prevents the adhesive from dripping when it oozes into the interior of the frame 3.

The object lens unit 50 is manufactured in the above manner. As has been described above, the object lens 50 has a three-component construction using the frame 3 in addition to the first optical element B and the second optical element A. Because of this, it is possible to carry out beforehand the relative positioning of the first optical element B and the second optical element A concerning the direction perpendicular to the optical axis with high precision.

Further, regarding the sequence of mounting, in the present description, the mounting of the first optical element B has been made first and the mounting of the second optical element A has been made next. Although this is due to convenience of designing because it is easier to observe from the side of the second optical element A with the smaller refractive power at the time of positioning, it is also possible to carry out the mounting by changing the order of assembling. When changing the order of mounting, the clearance is provided on the side of the first fitting portion 4. In addition, any one of the two fixing means can also not use an adhesive but can also be a squeeze fitting utilizing the difference in contraction upon heating. Further, other fixing means can be used, for example, the two optical elements A and B can be fixed to the frame 3 by laser welding. Further, the clearance need not be provided only on side of the second optical element A, but it can be provided both on the side of the second optical element A and on the side of the first optical element B.

Further, in any of the cases described above, regarding the first optical element B and the second optical element A, if the first optical element B and the second optical element A are manufactured so that no burrs are present on the flange surfaces that come into contact respectively with the first reference surface 6 and the second reference surface 7 (In FIG. 1, the left side surface of flange 1a of the first optical element B and the right side surface of flange 2a of the second optical element A), the lowering of the mounting accuracy due to burrs can be avoided even if burrs are present on the sides opposite to these surfaces.

Further, at the time of bonding, if the frame 3 has a tube-shaped form, although the first fitting portion 4 and the second fitting portion 5 are ring-shaped, the bonded part fixed by the supply of the adhesive can be present not over the entire fitting portions 4 and 5 but can be present discontinuously if the bonding strength is sufficient. By making the bonding-section discontinuous and by providing non-bonded locations in the above manner, the ventilation can be improved.

Further, the frame 3 has an anti-reflection coating which is the anti-reflection means on the inner surface side of the tube-shaped form. The anti-reflection coating is formed, for example, by coating the inner surface with the black-colored paint. Due to this, the generation of ghosts and can be prevented to increase the accuracy of tracking. Further, instead of forming an anti-reflection coating on the inside surface of the frame 3, the frame using a material with light absorption characteristics can be formed.

Further, it is also possible that the frame 3 is provided with a protector on the side of the optical disks D1, D2, and D3 for preventing contact between the lens and each of the optical disks D1, D2, and D3.

The laser light that impinges on the second optical element A from the side of the light source (left side in FIG. 1) and that has different wavelengths corresponding to the optical disks D1, D2, and D3 is converted into a diffracted light by the second optical element A. The diffracted light of different order of diffraction depending on the wavelength is condensed by the first optical element B and a spot of it is formed on each of information recording surfaces M1, M2, and M3 of the optical disks D1, D2, and D3. The laser light reflected on the optical disks D1, D2, and D3 is collected via the first optical element B and the second optical element A, and it is guided to the sensor which is not shown in the figure. Because of the presence of such an object lens unit 50, three types of laser light can be used as the information reading light or the information recording light for the optical disks D1, D2, and D3.

Further, here, by providing a frame 3 with an aperture 10 between the first optical element B and the second optical element A, it not only becomes possible to cut off unwanted light that becomes the cause of noise or to adjust the amount of light, but also it becomes unnecessary to provide a new aperture in the optical pickup device installed with the object lens unit 50 whereby the unit can be made compact.

The Second Preferred Embodiment

Figure 2:
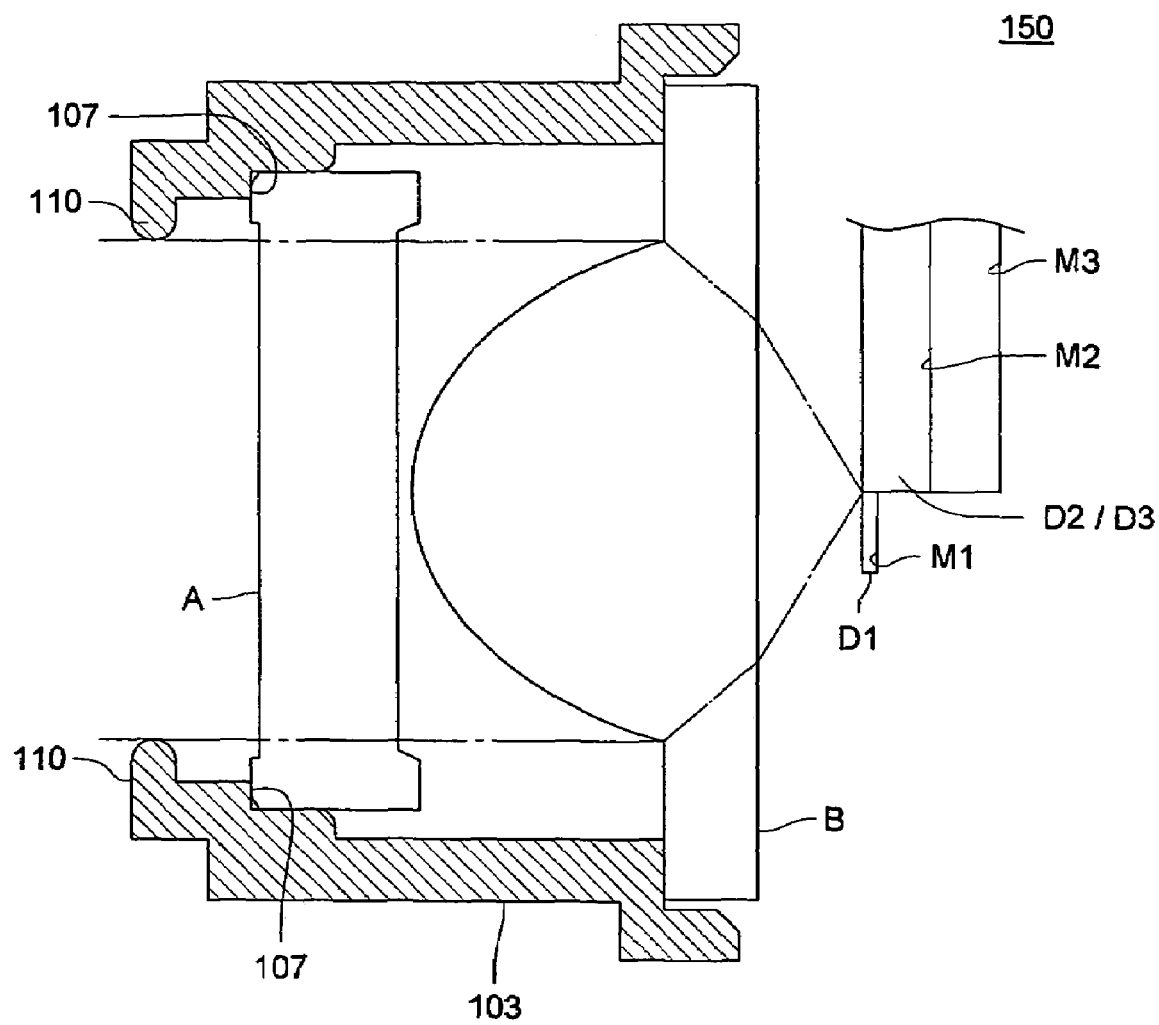
FIG. 2 is a cross-sectional side view of the object lens unit of the second preferred embodiment.

In the first preferred embodiment, as is shown in FIG. 1, although the aperture 10 has been positioned between the first optical element B and the second optical element A, the aperture 10 can also be positioned on the light source side of the first optical element B and the second optical element A. FIG. 2 is a side cross-sectional view of the object lens unit 150 of the second preferred embodiment in which the aperture 110 is present on the light source side. In the present preferred embodiment, since the object lens unit 150 has a structure identical to that of the object lens unit 50 of the first preferred embodiment, except for the structure of the frame 103, its explanation will be omitted here. In the frame 103 according to the present preferred embodiment, the aperture 110 is positioned, in the figure, at the left end (light source side) of the frame 103. Further, because of this, unlike in the first preferred embodiment, the second reference surface 107 comes into contact with the light source side of the second optical element A (at the left side in the figure). In addition, because of this, in the manufacturing process, both the first optical element B and second optical element A are formed by dropping them in from the optical disk side.

In this preferred embodiment, because of placing the aperture 110 on the light source side of the first optical element B and the second optical element A, the unwanted light that becomes the cause of noise can be cut off before it enters the object lens unit 150, and it also becomes possible to adjust the amount of laser light.

The Third Preferred Embodiment

Figure 3A:
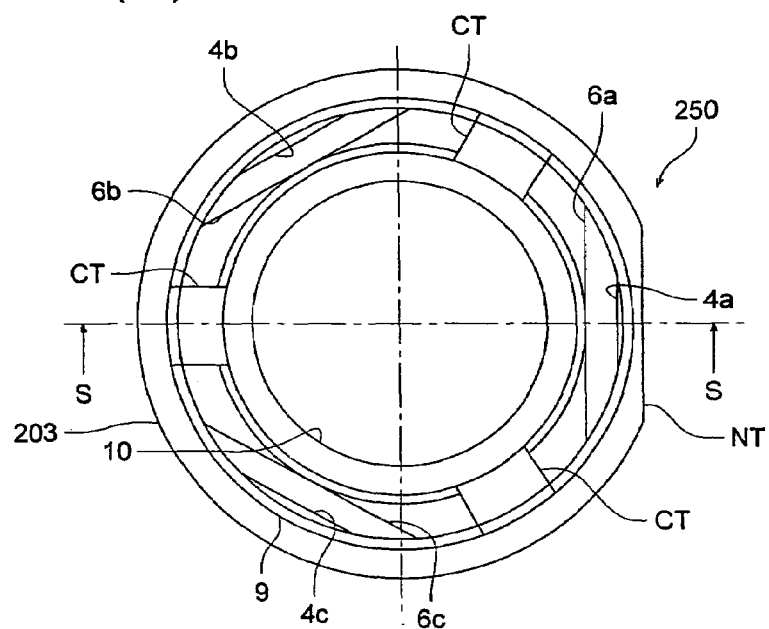
FIGS. 3(a) to 3(c) are the plan view and cross-sectional side view diagrams of the object lens unit of the third preferred embodiment.
Figure 3B:
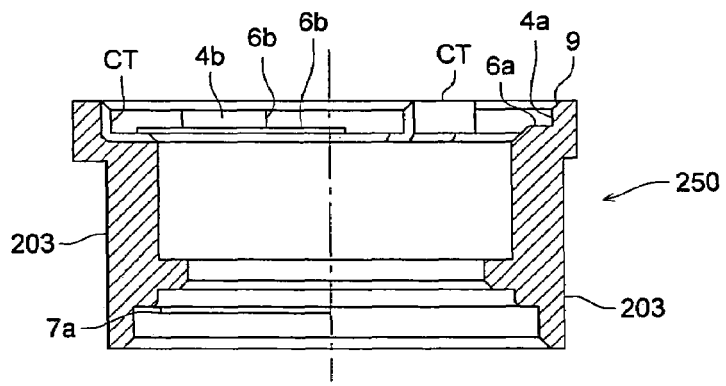
Figure 3C:
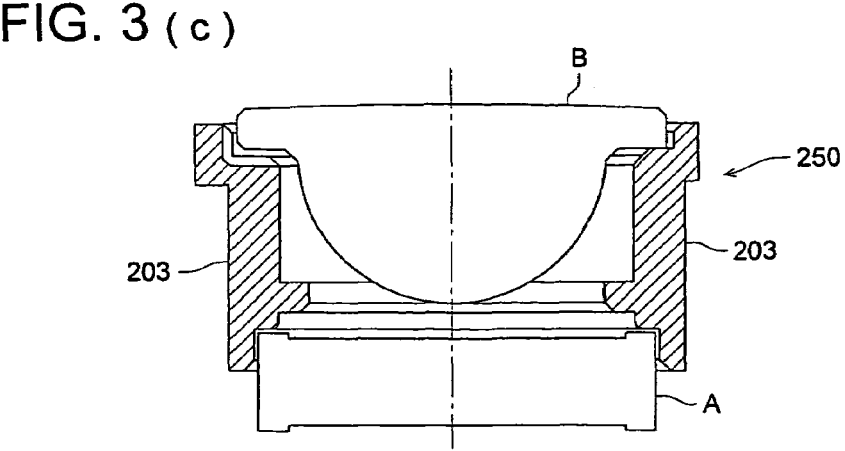

FIG. 3 is a view for explaining the object lens unit 250 according to the third preferred embodiment of the present invention, and this object lens unit 250 has the cutout CT for ventilation. FIG. 3(a) is the plan view of seeing the frame 203 from the side of the first optical element B, and FIG. 3(b) is the cross-sectional view on the S-S line, and FIG. 3(c) is a cross-sectional side view showing the state of mounting the first optical element B and second optical element A on the frame. Further, all descriptions will be omitted in this preferred embodiment of items other than that is explained afresh because they are identical to the other preferred embodiments.

In this preferred embodiment, the first fitting portion 4 that is present on the inside of the frame 203 being approximately ring-shaped has additionally a single or a plurality of cutouts CT with a specific spacing (in specific terms, at three locations as is shown in FIG. 3(a)). Here, the first fitting portion 4 has an approximate ring shape comprising a discontinuous ring-shaped part and the plane sections 4a, 4b, and 4c. The first optical element B is positioned in a direction perpendicular to the optical axis by these flat sections 4a, 4b, and 4c. Further, the frame 203 has a plurality of contact sections 6a, 6b, and 6c that carry out the role of the first reference surface 6 as the supporting section of the first optical element B. Each of these contact sections 6a, 6b, and 6c is a plane perpendicular to the optical axis, and these are placed at approximately equal intervals along the peripheral directions. As is shown in FIG. 3(c), the first optical element B is aligned by being supported by each of the contact sections 6a, 6b, and 6c. While the flange of the first optical element B is fixed to the frame 203 via the contact section 6a, an air vent hole is formed by the cutout CT between the first optical element B and the frame 203. Because of this, air is not kept sealed in the interior of the object lens unit 250, and hence, it is difficult for condensation to occur. Furthermore, at the time of bonding the first optical element B, by making the bonding locations discontinuous and not over the entire adhesive collecting section 9 thereby providing non-bonded portions, the ventilation can be ensured.

Further, as can be seen in FIG. 3(b), even on the side of the second optical element A, it is also possible to provide a contact section 7a and the like. Because of this, at the time of supporting the second optical element A by the contact section and bonding it, by making the bonding locations discontinuous and not over the entire adhesive collecting section 9 thereby providing non-bonded portions, the ventilation can be ensured. In addition, it is also possible to provide a cutout for further ventilation even on the second fitting portion 5.

Figure 4:
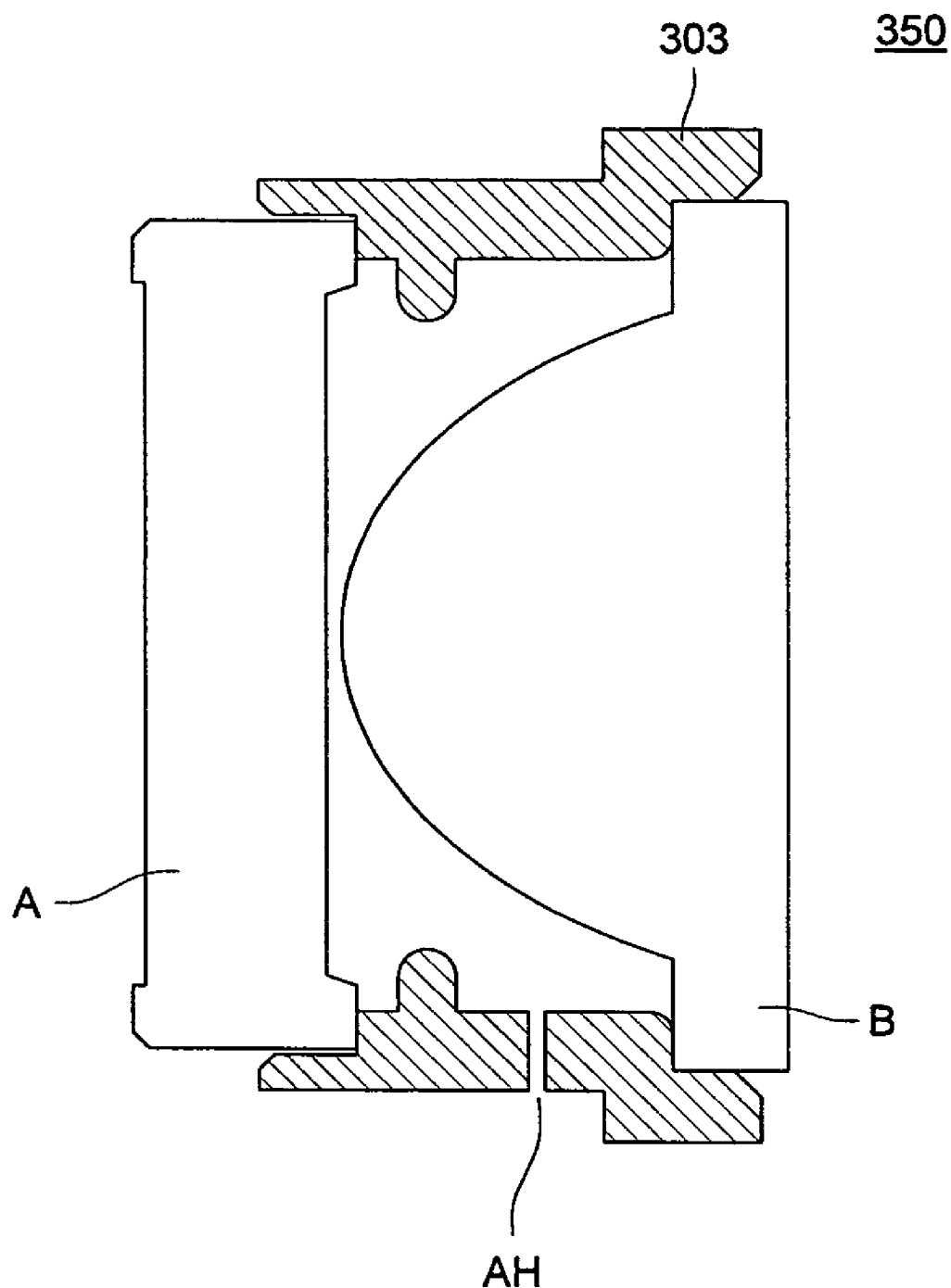
FIG. 4 is a cross-sectional side view of the object lens unit of a modified example of the third preferred embodiment.

Further, ventilation of air to the outside of the frame 203 can be achieved by measures other than the above cutouts CT for ventilation. Although the object lens unit 350 of the modified example shown in FIG. 4 has an overall construction that is identical to that of the object lens unit 50 shown in FIG. 1, ventilation of air to the outside of the frame 303 has been achieved by providing one or more ventilation holes AH (at one location in FIG. 4) on it.

Coming back to FIG. 3(a), in the present preferred embodiment, in addition, a cutout NT has been formed on the circumferential edge of the frame 203. The cutout NT is used, for example, as a reference mark that becomes the index of the direction of the astigmatism of the object lens unit 250. By fixing it to the holder in the condition in which the cutout NT is oriented in a specific direction, it becomes possible to design the optical pickup device to which consideration of the direction of astigmatism is given.

The Fourth Preferred Embodiment

Figure 5:
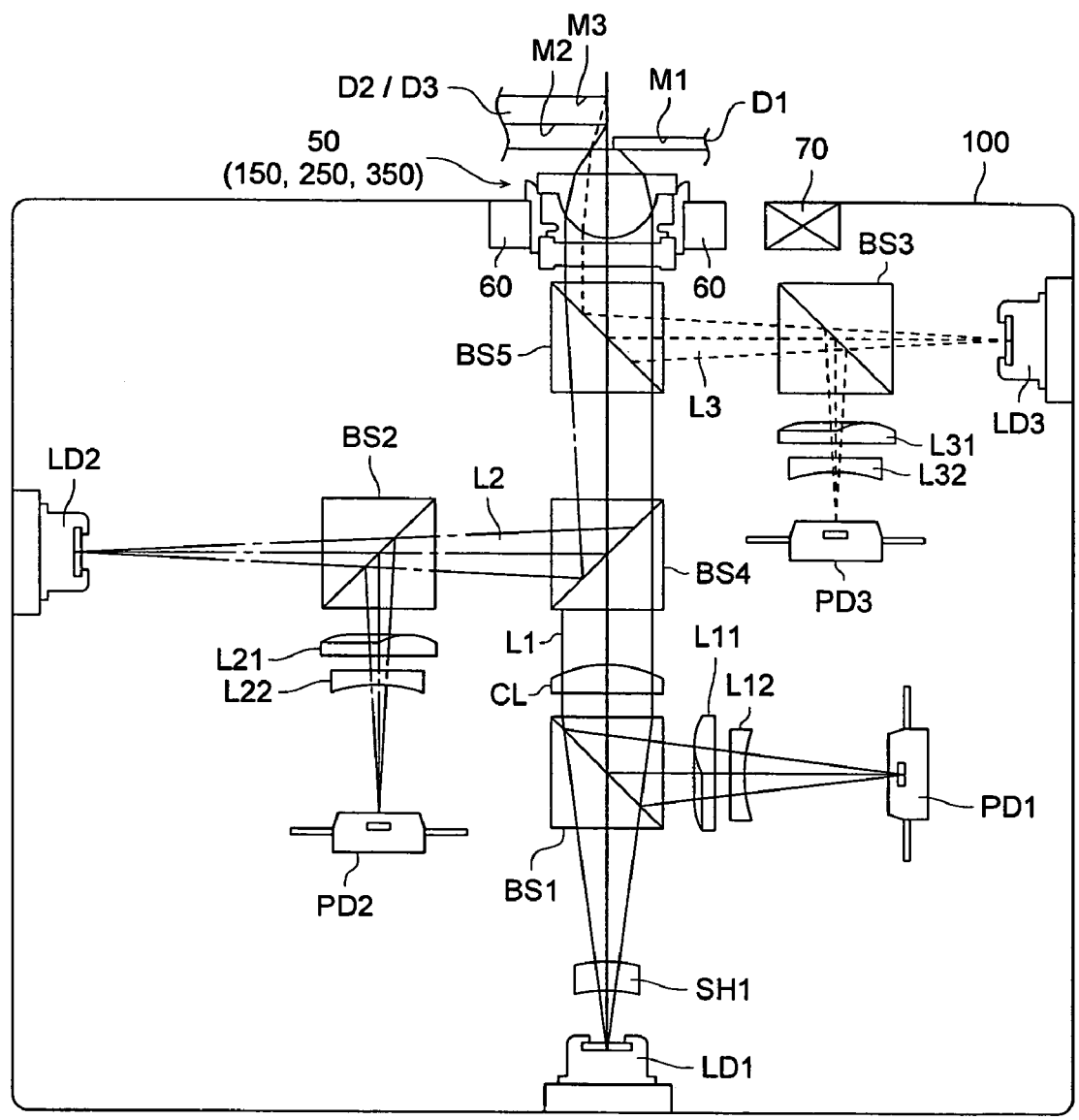
FIG. 5 is a plan view illustrating the structure of the optical pickup device of the fourth preferred embodiment.

FIG. 5 is a plan view explaining the structure of the optical pickup device 100 of the fourth preferred embodiment. The optical pickup device 100 according to the present preferred embodiment is compatible with three types of optical disks conforming to different standards (high density DVD, DVD, and CD), and has been constructed so as to make information recording and reproduction possible with these optical disks.

The optical pickup device 100 is provided with semiconductor lasers LD1, LD2, and LD3, a beam shaper SH1, a collimator CL, beam splitters BS1, BS2, BS3, BS4, and BS5, cylindrical lenses L11, L21, and L31, concave lenses L12, L22, and L32, photo detectors PD1, PD2, and PD3, a object lens unit 50, a holder 60, and a 2-dimensional actuator 70. The object lens unit 50 is mounted to the optical pickup device 100 via the holder 60 in a movable manner. In the description of this preferred embodiment given here, although the object lens unit 50 of the first preferred embodiment has been used as the object lens unit, it can be also replaced by the object lens units 150, 250 and 350 of other preferred embodiments.

In this optical pickup device 100, regarding high density DVD, DVD, and CD, the laser light L1 of a wavelength of 405 nm emitted from the semiconductor laser LD1, the laser light L2 of a wavelength of 650 nm emitted from the semiconductor laser LD2, the laser light L3 of a wavelength of 780 nm emitted from the semiconductor laser LD3 are used respectively for reading out the information from the information recording surfaces of the optical disks D1, D2, and D3 for high density DVD, DVD, and CD.

When carrying out data recording or reproduction by the optical disk D1 for high density DVD, the laser light L1 with a wavelength of 405 nm emitted from the semiconductor laser LD1 is shaped by passing through the beam shaper SH1, passes through the beam splitter BS1, gets converted into a parallel beam by the collimator CL, passes through the beam splitters BS4 and BS5, and then enters the object lens unit 50. Next, by the object lens unit 50, the laser light L1 is condensed on the information recording surface M1 of the optical disk D1 having a transparent protective substrate.

The laser light L1 modulated and reflected by the information pit on the information recording surface M1 again passes through the object lens unit 50, the beam splitters BS5 and BS4, and the collimator CL, and gets reflected by the beam splitter BS1, has astigmatism applied to it by the cylindrical lens L11, passes through the concave lens L12, and enters the photo detector PD1. The read out signal of the information recorded in the optical disk D1 is obtained using the signal output by the photo detector PD1.

When carrying out data recording or reproduction by the optical disk D2 for DVD, the laser light L2 with a wavelength of 650 nm emitted from the semiconductor laser LD2 passes through the beam splitter BS2, gets reflected by the beam splitter BS4, passes through the beam splitter BS5, and then enters the object lens unit 50. Next, by the object lens unit 50, the laser light L2 is condensed on the information recording surface M2 of the optical disk D2 having a transparent protective substrate.

The laser light L2 modulated and reflected by the information pit on the information recording surface M2 again passes through the object lens unit 50 and the beam splitter BS5, gets reflected by the beam splitters BS4 and BS2, has astigmatism applied to it by the cylindrical lens L21, passes through the concave lens L22, and enters the photo detector PD2. The read out signal of the information recording on the optical disk D2 is obtained using the signal output by the photo detector PD2.

When carrying out data recording or reproduction by the optical disk D3 for CD, the laser light L3 with a wavelength of 780 nm emitted from the semiconductor laser LD3 passes through the beam splitter BS3, gets reflected by the beam splitter BS5, and then enters the object lens unit 50. Next, by the object lens unit 50, the laser light L3 is condensed on the information recording surface M3 of the optical disk D3 having a transparent protective substrate.

The laser light L3 modulated and reflected by the information pit on the information recording surface M3 again passes through the object lens unit 50, gets reflected by the beam splitters BS5 and BS3, has astigmatism applied to it by the cylindrical lens L31, passes through the concave lens L32, and enters the photo detector PD3. The read out signal of the information recorded on the optical disk D3 is obtained using the signal output by the photo detector PD3.

At the time of recording or reproducing high density DVD, DVD, and CD, focusing detection and tracking detection are carried out by detecting changes of light quantity from changes in the shape and changes in the position of the spot on the photo detectors PD1, PD2, and PD3. Based on the result of this detection, the 2-dimensional actuator 70 moves the holder 60 along with the object lens unit 50 so that the laser light L1, L2, and L3 from the semiconductor lasers LD1, LD2, and LD3 are allowed to form images on the information recording surfaces M1, M2, and M3 of the optical disks D1, D2, and D3, and also, moves the holder 60 along with the object lens unit 50 so that the laser light L1, L2, and L3 from the semiconductor lasers LD1, LD2, and LD3 are allowed to form images on a specific track.

Further, aberration correction of the first optical element B has been conducted for the transparent protective substrate (thickness of 0.1 mm) of the optical disk D1 for high density DVD, and the designed wavelength is 405 nm, focal length is 2.2 mm, and the numerical aperture number on the recording media side is 0.85.

When the first optical element B is used for recording or reproducing data with a DVD (wavelength: 650 nm, numerical aperture number on the recording media side: 0.65, thickness of transparent protective substrate: 0.6 mm) or a CD (wavelength: 780 nm, numerical aperture number on the recording media side: 0.50, thickness of transparent protective substrate: 1.2 mm), the spherical aberration due to the difference in the thickness of the transparent protective substrate changes in the direction of overcorrection. Even if the third order spherical aberration component of the spherical aberration changing towards overcorrection is removed by allowing the radiating light flux to enter the first optical element B, higher order spherical aberration components still remain, and in that condition information recording and reproduction with DVD and CD cannot be carried out.

Further, the semiconductor laser LD1 which is the light source for high density DVD is a blue-violet semiconductor laser and it is said that its wavelength changes by about 1 nm due to mode hopping. When the wavelength of the incident light becomes 406 nm which is longer by 1 nm than the designed wavelength of the first optical element B, the best imaging position evaluated by wave front aberration changes by 0.49 μm, due to which a defocusing component is added and the wave front aberration gets deteriorated to 0.162 λrms. Therefore, stable information recording and reproduction cannot be made since the condensing performance gets deteriorated substantially for an optical disk D1 of high density DVD during mode hopping when the first optical element B is used alone.

In addition, if it is assumed that the change in the refractive index due to temperature raise of the first optical element B is $-9.0 \times 10^{-5}/°$ C. and that the rate of change of the wavelength of the blue-violet semiconductor laser due to temperature raise is 0.05 nm/° C., the spherical aberration of the first optical element B changes towards overcorrection due to a temperature rise of 30° C., and the wave front aberration during recording and reproduction of a high density DVD deteriorates to 0.145 λrms. Therefore, stable information recording and reproduction cannot be made since the condensing performance gets deteriorated substantially for an optical disk of high density DVD during a temperature rise when the first optical element B is used alone.

In view of this, by using the diffraction effect of the diffraction structure formed in the second optical element A, the object lens unit 50 of the present preferred embodiment compensates for changes in the spherical aberration due to difference in the thickness of the transparent protective substrate, changes in the best imaging position caused by mode hopping in the blue-violet semiconductor laser LD2, and the changes in the spherical aberration caused by changes in the refractive index associated with changes in the temperature.

Further, by providing an appropriate ring-shaped diffraction structure on the optical surface of the second optical element A, the object lens unit 50 according to the present preferred embodiment can be designed so that information recording and reproducing is possible in all cases if the light for information recording and reproduction used is, for example, the 6th order diffraction light generated by the diffraction structure of the second optical element A for a high density DVD, the 4th order diffraction light generated by the diffraction structure of the second optical element A for a standard DVD, the 3rd order diffraction light generated by the diffraction structure of the second optical element A for a CD.

When carrying out information recording and reproduction such as the above, for example, it is necessary to suppress the comatic aberration in a DVD to 0.02 λ or less. In order to satisfy this, it is necessary to adjust the relative positions of the first optical element B and second optical element A in a direction perpendicular to the optical axis with a high accuracy of within a few μm. Therefore, for example, it is important to provide the clearance 8 in each of the fitting portions 4 and 5 and to carry out bonding while making adjustment.

Figure 6:
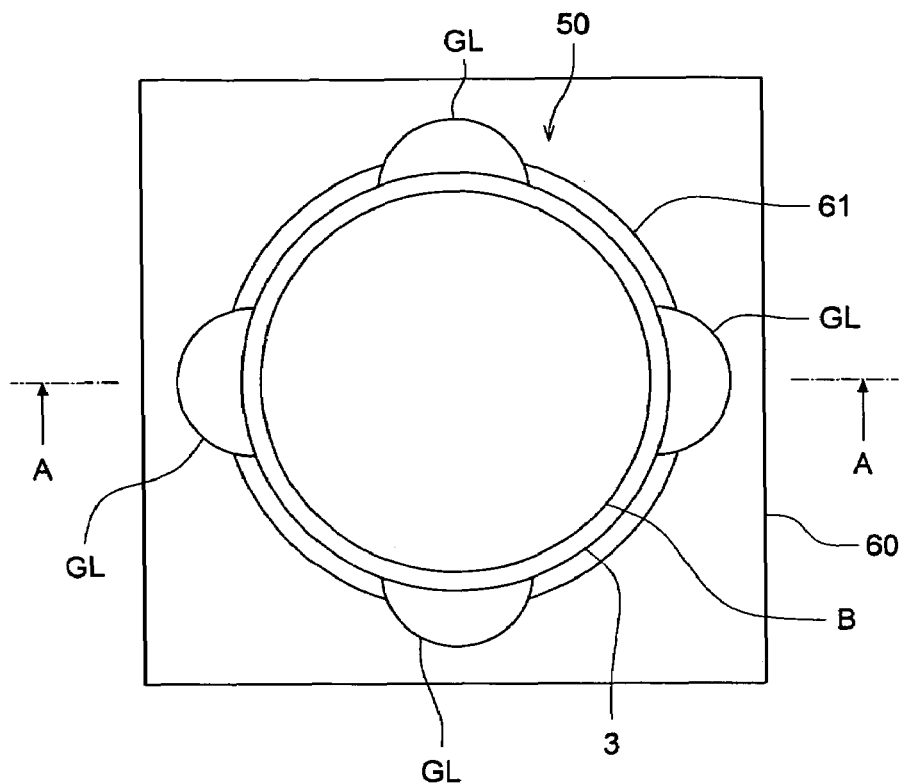
FIGS. 6(a) and 6(b) are diagrams illustrating the mounting of the object lens unit in the optical pickup device.
Figure 6:
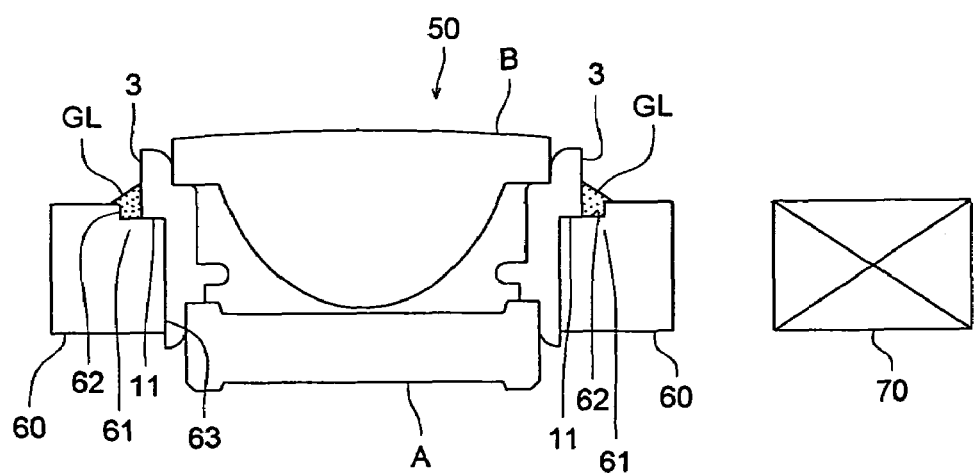

FIG. 6(a) is a plan view for explaining the mounting of the object lens unit 50 according to the present preferred embodiment in an optical pickup device 100, FIG. 6(b) is its cross-sectional view at A-A, which corresponds with FIG. 5. By mounting the object lens unit 50, the manufacturing process of which was described in the first preferred embodiment, to the holder 60 which is a part of the optical pickup device 100, the object lens unit 50 can be used as a component member of the optical pickup device 100.

The holder 60 is provided with the unit mounting section 61 for the object lens unit 50. The object lens unit 50 takes the third reference surface 11 provided on the frame 3 as the reference for the mounting position and the third reference surface 11 is supported by the contact section 62 provided on the unit mounting section 61. In addition, the third fitting portion 12 mates with the side surface section 63 of the unit mounting section 61. Because of this, the object lens unit 50 is installed at a specific location of the holder 60, and the object lens 50 and the holder 60 are fixed by injecting adhesive GL from the periphery of the unit mounting section 61 (at four locations in FIG. 6(a)). Further, because a clearance is formed between the third fitting portion 12 and the side surface section 63, it can be considered that adjustment for relative positioning of the object lens unit 50 can be carried out with respect to other members in a direction perpendicular to the optical axis. As a modified example of the holder 60 shown in the figure, in order to prevent adhesive GL from overflowing at the time of adhering, a V-shaped groove that is formed as the adhesive collecting section can be provided by the conjunction between the frame 3 and the unit mounting section 61.

Here, regarding the first optical element B and the second optical element A, since the alignment operation has already been made during the process of manufacturing the object lens unit 50, there is no need to carry out the alignment operation again at the time of mounting to the holder 60. In addition, because the frame 3 of the object lens unit 50 is provided with the third reference surface 11, it is not only possible to carry out alignment definitely during mounting to the holder 60, but also it is possible to carry out relative positioning of the object lens unit 50 relative to other members in a direction perpendicular to the optical axis using the third fitting portion 12.

As is evident from the above, by supporting the object lens unit 50 by the holder 60, and by controlling the drive of the entire holder 60 using the two-dimensional actuator 70 provided in the optical pickup device 100, the displacement of the object lens unit 50 is carried out in two dimensions.

Figure 7:
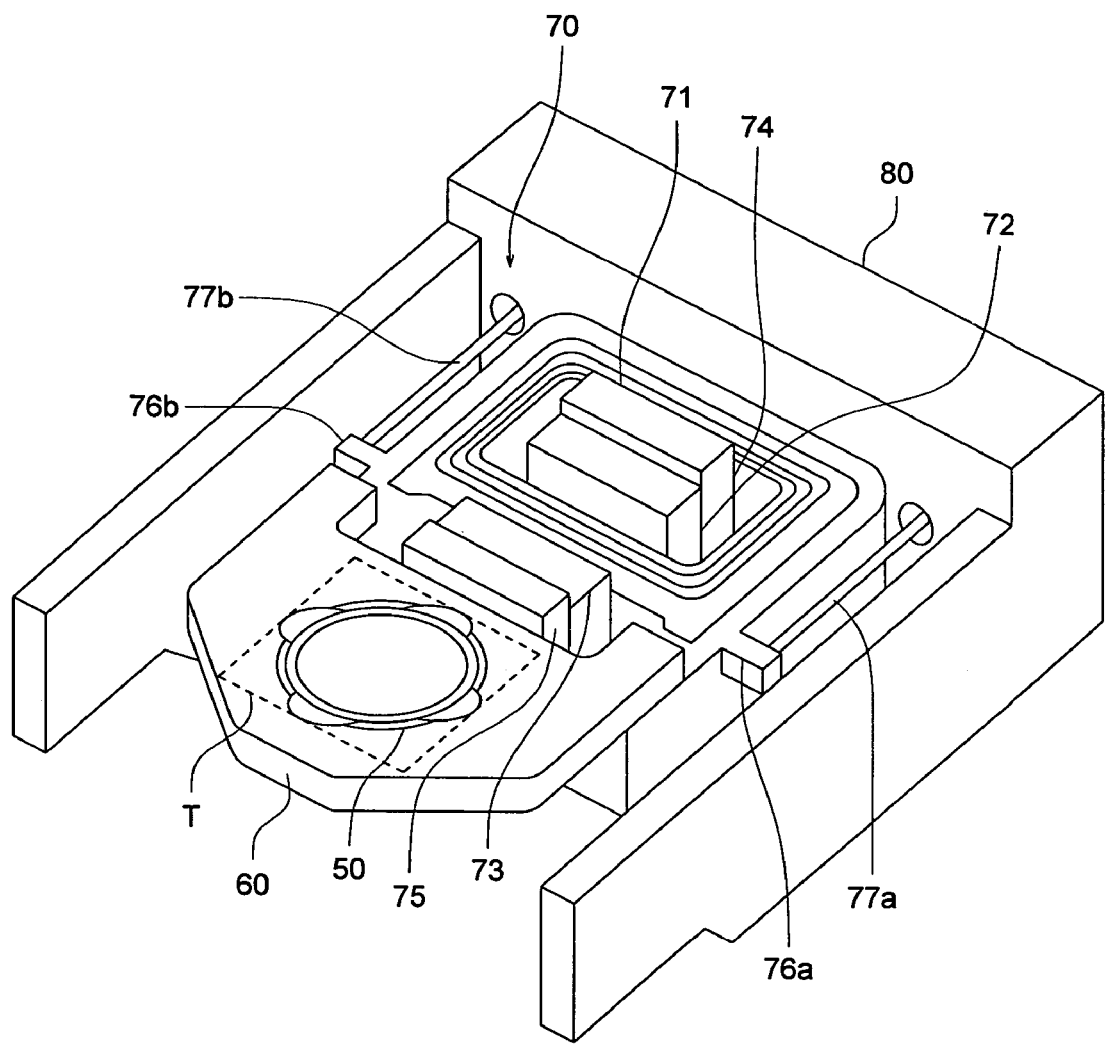
FIG. 7 is a perspective view showing the object lens unit mounted on the holder.

FIG. 7, in the present preferred embodiment, is a perspective view showing one form in which the object lens unit 50 is mounted to the holder 60 inside the optical pickup device 100. The area T corresponds to FIG. 6(a). The drive control of the holder 60 to which the object lens unit 50 has been mounted is carried out by the two-dimensional actuator 70 for focusing and tracking. In addition, the entire mechanism is supported and the object lens unit is connected and fixed to the body of the optical pickup device 100 by the base plate 80.

The two-dimensional actuator 70 is provided with a focusing coil 71, a pair of magnets 72 and 73, yokes 74 and 75 that support the pair of magnets 72 and 73, upper connecting sections 76a and 76b, a lower connection section (not shown in the figure because it is hidden by the holder 60 and the base plate 80), upper elastic supporters 77a and 77b, lower elastic supporters (not shown in the figure because it is hidden by the holder 60 and the base plate 80), and a tracking coil (not shown in the figure because it is provided inside the two-dimensional actuator). Further, two lower elastic supporters are present and are placed right below the upper elastic supporters 77a and 77b respectively. Two lower connecting sections are present and are placed right below the upper connecting sections 76a and 76b. The upper elastic supporters 77a and 77b and the lower elastic supporter are placed so that they are parallel to the horizontal direction, and one end of these bodies are fixed after passing through the base plate 80, while the other ends are inserted through the upper connection sections 76a and 76b and the lower connecting sections that project on both sides of the holder 60, and are fixed elastically. The holder 60 is driven in the vertical direction by the focusing coil 71, and driven in the horizontal direction by the tracking coil which is not shown in the figure. As is also clear from the figure, the holder 60 has a non-symmetrical structure, and is not suitable for fixing directly the first optical element B and the second optical element A with a high accuracy. In actuality, when directly mounting the first optical element B and the second optical element A to a conventional type lens holder having a structure similar to that of the holder 60, for example, the process is that of bonding initially the first optical element B, turning upside down the entire lens holder, and bonding the second optical element A while adjusting it in the perpendicular direction to the optical axis. The lens holder, however, generally has a complicated shape, and since even its size is considerably large compared to that of the frame 3, the manufacturing equipment becomes correspondingly large and the ease of adjustment work gets lost. On the other hand, when the object lens unit 50 is used in which the first optical element B and the second optical element A have been aligned and fixed beforehand with a high accuracy, since all the relative positions between each of the lenses inside the object lens unit 50 have already been determined with a high accuracy, it is possible to carry out easily the mounting of the object lens system with a relatively high accuracy irrespective of the shape of the holder 60.

What is claimed is:

1. An object lens unit for an optical pickup comprising:
a first optical element positioned facing an optical information recording medium;
a second optical element positioned on a light source side of the first optical element; and
a frame which has a first reference surface in contact with the first optical element to position the first optical element in an optical axis direction and a second reference surface in contact with the second optical element to position the second optical element in the optical axis direction so that the first optical element and the second optical element are fixed to be integrated with the frame,
wherein the first optical element, the second optical element and the frame are attached, as a single optical component, to another member;
wherein the frame comprises a first fitting portion and a second fitting portion in which the first optical element and the second optical element are respectively fitted, to determine relative positions of the first optical element and the second optical element to each other in a perpendicular direction to the optical axis, and
wherein the frame has a prescribed clearance in a perpendicular direction to the optical axis in at least one of the first fitting portion and the second fitting portion to adjust a position of at least one of the first optical element and the second optical element in a perpendicular direction to the optical axis before fixing the first optical element and the second optical element to the frame and the at least one of the first optical element and the second optical element having the prescribed clearance is fixed with an adhesive.

2. The object lens unit of claim 1, wherein the frame comprises a third reference surface to position the first reference surface and the second reference surface relative to another member.

3. The object lens unit of claim 1, wherein the frame comprises a third fitting portion to determine relative positions of the first fitting portion and the second fitting portion to another member in a perpendicular direction to the optical axis.

4. The object lens unit of claim 1, wherein the first reference surface is perpendicular to the optical axis.

5. The object lens unit of claim 1, wherein the second reference surface is perpendicular to the optical axis.

6. The object lens unit of claim 1, wherein the first optical element, the second optical element and the frame are plastic moldings.

7. The object lens unit of claim 1, wherein the second optical element has an orbicular zone structure in which the second optical element is divided into a plurality of orbicular zones at least on one optical surface so that neighboring orbicular zones-cause prescribed optical path differences for received incident light.

8. The object lens unit of claim 7, wherein the orbicular zone structure is a diffraction structure and the second optical element is a diffraction lens.

9. The object lens unit of claim 1, wherein the frame has an aperture.

10. The object lens unit of claim 9, wherein the aperture is positioned between the first optical element and the second optical element.

11. The object lens unit of claim 9, wherein the aperture is positioned on a light source side of the second optical element.

12. The object lens unit of claim 1, wherein the frame has a reflection preventive means at least on an inner surface of the frame.

13. The object lens unit of claim 1, wherein at least one of the first fitting portion and the second fitting portion has an adhesive collecting section forming a groove in conjunction with the first optical element or the second optical element.

14. The object lens unit of claim 1, wherein the frame has a tube-shaped form and has the first reference surface and the first fitting portion on one end side and the second reference surface and the second fitting portion on another end side.

15. The object lens unit of claim 14, wherein separate adhering sections are formed along at least one of circumferences of the first fitting portion and the second fitting portion.

16. The object lens unit of claim 14, wherein the frame has a vent hole allowing an interior and an exterior of the frame to communicate at a prescribed position between the first reference surface and the second reference surface.

17. The object lens unit of claim 14, wherein at least one combination among a combination of the first fitting portion and the first reference surface and a combination of the second fitting portion and the second reference surface has a cutout allowing an interior and an exterior of the frame to communicate.

18. An optical pickup device comprising:
the object lens unit of claim 1;
a holder supporting the object lens unit and shifting together with the object lens unit; and
a fixing means to fix the object lens unit to the holder, wherein the object forms a light spot on a recording surface of an optical information recording medium.

* * * * *